United States Patent
Beletski et al.

(10) Patent No.: US 9,612,126 B2
(45) Date of Patent: Apr. 4, 2017

(54) VISUAL TRAVEL GUIDE

(75) Inventors: Oleg Beletski, Espoo (FI); Sampo Tuomas Vaittinen, Helsinki (FI); Timo-Pekka Olavi Viljamaa, Helsinki (FI); Tommi Juhani Lahti, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 2352 days.

(21) Appl. No.: 11/949,290

(22) Filed: Dec. 3, 2007

(65) Prior Publication Data

US 2009/0143977 A1   Jun. 4, 2009

(51) Int. Cl.
*G01C 21/00* (2006.01)
*G01C 21/34* (2006.01)
*G01C 21/36* (2006.01)

(52) U.S. Cl.
CPC ......... *G01C 21/343* (2013.01); *G01C 21/362* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,559,707 A * | 9/1996 | DeLorme | ............... | G01C 21/20 340/990 |
| 5,948,040 A * | 9/1999 | DeLorme | ............... | G01C 21/36 340/990 |
| 6,401,034 B1 * | 6/2002 | Kaplan | ............... | G01C 21/3682 340/988 |
| 6,826,472 B1 * | 11/2004 | Kamei | ............... | G01C 21/3605 340/995.19 |
| 6,845,321 B1 * | 1/2005 | Kerns | ............... | G01C 21/3679 340/988 |
| 6,983,203 B1 * | 1/2006 | Wako | ............... | G01C 21/3682 340/988 |

(Continued)

FOREIGN PATENT DOCUMENTS

EP   1 193 626 A1   4/2002

OTHER PUBLICATIONS

TomTom, portable GPS car navigation systems, <http://web.archive.org/web/20051231184850/http://www.tomtom.com/>, 2005, 3 pages.

(Continued)

*Primary Examiner* — Bhavesh V Amin
(74) *Attorney, Agent, or Firm* — Ditthavong & Steiner, P.C.

(57) ABSTRACT

A novel method, apparatus, and system are disclosed that provide a mobile terminal user with up to date information regarding a point/location of interest. A user may identify a destination, and subsequently select points of interest at the destination from photos, audio or other media displayed to the user. Each media item may be geo-tagged or otherwise associated with a particular point of interest, tourist location, museum, etc. For example, when visiting Washington, D.C., the user may be shown photos of the Washington Monument, Smithsonian Museums, Lincoln Memorial, and the White House. The user may select one or more of the points of interest, and the system then generates an itinerary and/or a walking/driving/biking travel route responsive to the selected media items.

19 Claims, 13 Drawing Sheets

(56) References Cited

U.S. PATENT DOCUMENTS

| | | | | |
|---|---|---|---|---|
| 7,321,826 B2* | 1/2008 | Sheha | G01C 21/3632 | 340/995.24 |
| 2002/0138196 A1* | 9/2002 | Polidi | G01C 21/3682 | 701/409 |
| 2003/0036848 A1* | 2/2003 | Sheha | G01C 21/3679 | 701/468 |
| 2003/0158658 A1* | 8/2003 | Hoever | G01C 21/3605 | 701/533 |
| 2003/0191578 A1* | 10/2003 | Paulauskas | G01C 21/3682 | 701/438 |
| 2004/0030678 A1* | 2/2004 | Tu | G06F 7/22 | |
| 2004/0243306 A1* | 12/2004 | Han | G01C 21/3682 | 701/438 |
| 2005/0049765 A1* | 3/2005 | Chetia | G06Q 30/02 | 701/31.4 |
| 2005/0107949 A1* | 5/2005 | Yokota | G01C 21/3611 | 701/532 |
| 2006/0229807 A1* | 10/2006 | Sheha | G01C 21/3679 | 701/468 |
| 2006/0253247 A1* | 11/2006 | de Silva | G01C 21/3611 | 701/426 |
| 2007/0118281 A1* | 5/2007 | Adam | G01C 21/3647 | 701/431 |
| 2007/0276596 A1* | 11/2007 | Solomon | G01C 21/3632 | 701/431 |
| 2008/0082262 A1* | 4/2008 | Silva | G01C 21/3682 | 701/431 |
| 2008/0268876 A1* | 10/2008 | Gelfand | G06Q 30/02 | 455/457 |
| 2009/0143977 A1* | 6/2009 | Beletski | G01C 21/362 | 701/533 |

OTHER PUBLICATIONS

XTech 2006: "Building Web 2.0", <http://2006.xtech.org/schedule/paper/195>, May 16-19, 2006, Amsterdam, The Netherlands, 6 pages.

Sharing-Places.com, <http://web.archive.org/web/20070206122435/preview.sharing-places.com/>, Feb. 6, 2007, 1 page.

Welcome to Flickr—Photo Sharing, <http://web.archive.org/web/20051231152551/http://www.flickr.com/>, 2005, 1 page.

Panoramio—Photos of the World, <http://web.archive.org/web/20061201100603/http://www.panoramio.com/>, Dec. 1, 2006, 2 pages.

Picasa, <http://web.archive.org/web/20050923183613/http://picasa.google.com/>, 2005, 1 page.

Google Earth—Explore, Search and Discover, <http://web.archive.org/web/20051231043407/http://earth.google.com/>, 2005, 1 page.

Placeopedia.com—Connecting Wikipedia articles with their locations, <http://web.archive.org/web/20061107142757/http://www.placeopedia.com/>, Nov. 7, 2006, 2 pages.

Extended European Search Report for EP 08 17 0172 dated Jun. 26, 2012, pp. 1-5.

Office Action for corresponding European Patent Application No. 08170172.4-1557, dated Jan. 15, 2016, 5 Pages.

Office Action for corresponding European Patent Application No. 08 170 1724-1557, dated Sep. 21, 2016, 4 pages.

* cited by examiner

VISUAL TRAVEL GUIDE

FIELD

Aspects of the invention generally relate to computing technologies used to visually create a trip. More specifically, an apparatus, method and system are described for planning and obtaining an itinerary and a travel route based on visual information regarding a destination or point of interest and a user's personal preferences, past activities, and/or collaborative filtering.

BACKGROUND

Improvements in computing technologies have changed the way people accomplish various tasks. For example, a resident of Long Island, N.Y. may plan a road trip to visit Washington, D.C. Traditional techniques would require the tourist, who is unfamiliar with the details of the trip, to obtain printed materials, such as a map, paper book, or travel guide in order to chart out the trip. Printed materials are frequently outdated, however, and careful planning may be frustrated by construction, closed roadways and the like.

Additional techniques have since been developed in an effort to mitigate the short-comings associated with printed travel guides. Global Positioning System (GPS) navigational devices enable a user to obtain information about points of interest with accompanying directions. Geo-tagging of photographs and videos, and presenting the photographs and videos on an accompanying map has enabled users to share their experiences with one another regarding points of interest. For example, online sharing services like Flickr.com, locr.com, and twango.com provide opportunities to view a photo on a map representative of where the photo was taken. Also Lonely Planet has launched a lonelyplanet.tv service, where users can upload their travel videos and see them placed on a map. All of these techniques/devices have enhanced the state of the art in comparison to the aforementioned use of traditional print materials, but these techniques/devices have their own deficiencies. The amount of information available to a user is often expansive, and the user often has to undertake a time-consuming search process to pin-point the information that is of greatest interest.

For example, in relation to the preceding example, the tourist from New York may have heard through a friend that, in close proximity to Washington, D.C., inventors bring their inventions to be reviewed and evaluated for patentability. The tourist may have an interest in visiting the location referred to by his friend, but may be unaware that the location referred to is the United States Patent and Trademark Office (PTO). If the tourist's friend is not available to discuss the matter, the tourist will have to undertake a time-consuming search (e.g., reading articles, blogs, web-postings and the like) to pin-point the PTO as a place of interest. Thereafter, in order to visit the PTO, the tourist will need to learn where the PTO is located. The tourist, however, may acquire information via a web search directing him to the previous location of the PTO, Crystal City, Va., as opposed to the PTO's current location in Alexandria, Va.

Moreover, the tourist may have an interest in airplanes, having viewed an airplane stunt show five years ago. Thus, the tourist may have an interest in visiting the Smithsonian's National Air and Space Museum while visiting Washington, D.C. The tourist, however, might not even be aware that such an exhibit exists, or that there exists an Air & Space Museum annex near Dulles International Airport, and might miss out on the opportunity to visit it based on his lack of knowledge.

BRIEF SUMMARY

The following presents a simplified summary of aspects of the invention in order to provide a basic understanding of some aspects of the invention. This summary is not an extensive overview, and is not intended to identify key or critical elements or to delineate the scope of the claims. The following summary merely presents some concepts and aspects of the invention in a simplified form as a prelude to the more detailed description provided below.

To overcome limitations in the prior art described above, and to overcome other limitations that will be apparent upon reading and understanding the present specification, aspects of the present invention are directed to a novel apparatus, method and system for providing access to information in a visual, fast, and easy way via one or more computer platforms. More specifically, a user may select one or more visual elements from a community pool of information, a (commercial) content provider, or the like, and travel a route based on the selected one or more visual elements. A user may obtain additional, supplementary information while traveling the route, and the system may infer points of interest based on a person's past activities.

Various aspects of the invention may, alone or in combination with each other, provide a pool of information based on a point of interest within a proximal distance of a specified location, enable the specification of a temporal characteristic related to when a user intends to visit the specified location, provide the user with elements from the pool of information, and accept input from the user in response to the elements from the pool of information provided to the user, wherein the input specifies those elements of greatest interest to the user. Other various aspects of the invention may, alone or in combination with each other, provide supplementary information to the user related to those elements of greatest interest to the user, and provide a travel route to the user based on the elements of greatest interest to the user.

These and other aspects of the invention generally relate to a user indicating an interest in a destination and/or one or more points of interest, either explicitly or implicitly. A user may enter a destination and a time that he intends to arrive at the destination. A pool of information may be maintained amongst a user community related to various destinations. One or more computer platforms may present elements from the pool of information to the user that relate to the user's entered destination. A user may select one or more elements from the pool of information, and travel a route based on the selected one or more elements. A user may obtain additional, supplementary information while traveling the route.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which one or more aspects of the invention may be practiced. It is to be understood that other embodiments may be utilized and structural and functional modifications may be made without departing from the scope of the present invention.

Conventional current web services and guide books are based on written descriptions and small amounts of commercially created photos and/or videos. The services do not know where a user has been traveling and what he likes to do while on vacation. Thus, as demonstrated herein, one or more aspects of the invention provide for the ability to plan a trip in a visual, fast and easy to use way while obtaining the latest information available about a travel destination. One or more aspects of the invention provide an ability to match a person's interests to activities located at the destination.

Figure 1:
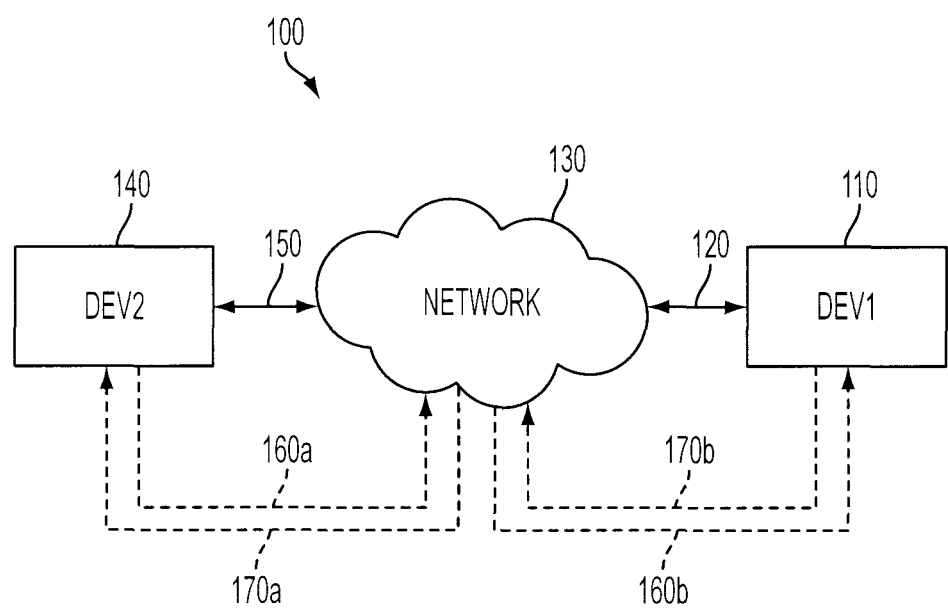
FIG. 1 illustrates a network computing environment suitable for carrying out one or more illustrative aspects of the invention.

FIG. 1 illustrates a network computing environment 100 suitable for carrying out one or more aspects of the present invention. For example, FIG. 1 illustrates a first device DEV1 110 (e.g., device 212, FIG. 2) connected to a network 130 via a connection 120. Network 130 may include the Internet, an intranet, wired or wireless networks, or any other mechanism suitable for facilitating communication between computing platforms in general. FIG. 1 also depicts a second device DEV2 140 (e.g., a server) connected to network 130 via a connection 150. By virtue of the connectivity as shown, DEV1 110 and DEV2 140 may communicate with one another. Such communications may enable the exchange of various types of information. For example, the communications may include data to be exchanged between DEV1 110 and DEV2 140. Such data may include images, files, and the like. The communications may further include additional information such as control information.

Connections 120 and 150 illustrate interconnections for communication purposes. The actual connections represented by connections 120 and 150 may be embodied in various forms. For example, connections 120 and 150 may be hardwired/wireline connections. Alternatively, connections 120 and 150 may be wireless connections. Connections 120 and 150 are shown in FIG. 1 as supporting bi-directional communications (via the dual arrow heads on each of connections 120 and 150). Alternatively, or additionally, computing environment 100 may be structured to support separate forward (160a and 160b) and reverse (170a and 170b) channel connections to facilitate the communication.

Computing environment 100 may be carried out as part of a larger network consisting of more than two devices. For example, DEV2 140 may exchange communications with a plurality of other devices (not shown) in addition to DEV1 110. The communications may be conducted using one or more communication protocols. Furthermore, computing environment 100 may include one or more intermediary nodes (not shown) that may buffer, store, or route communications between the various devices.

Figure 2:
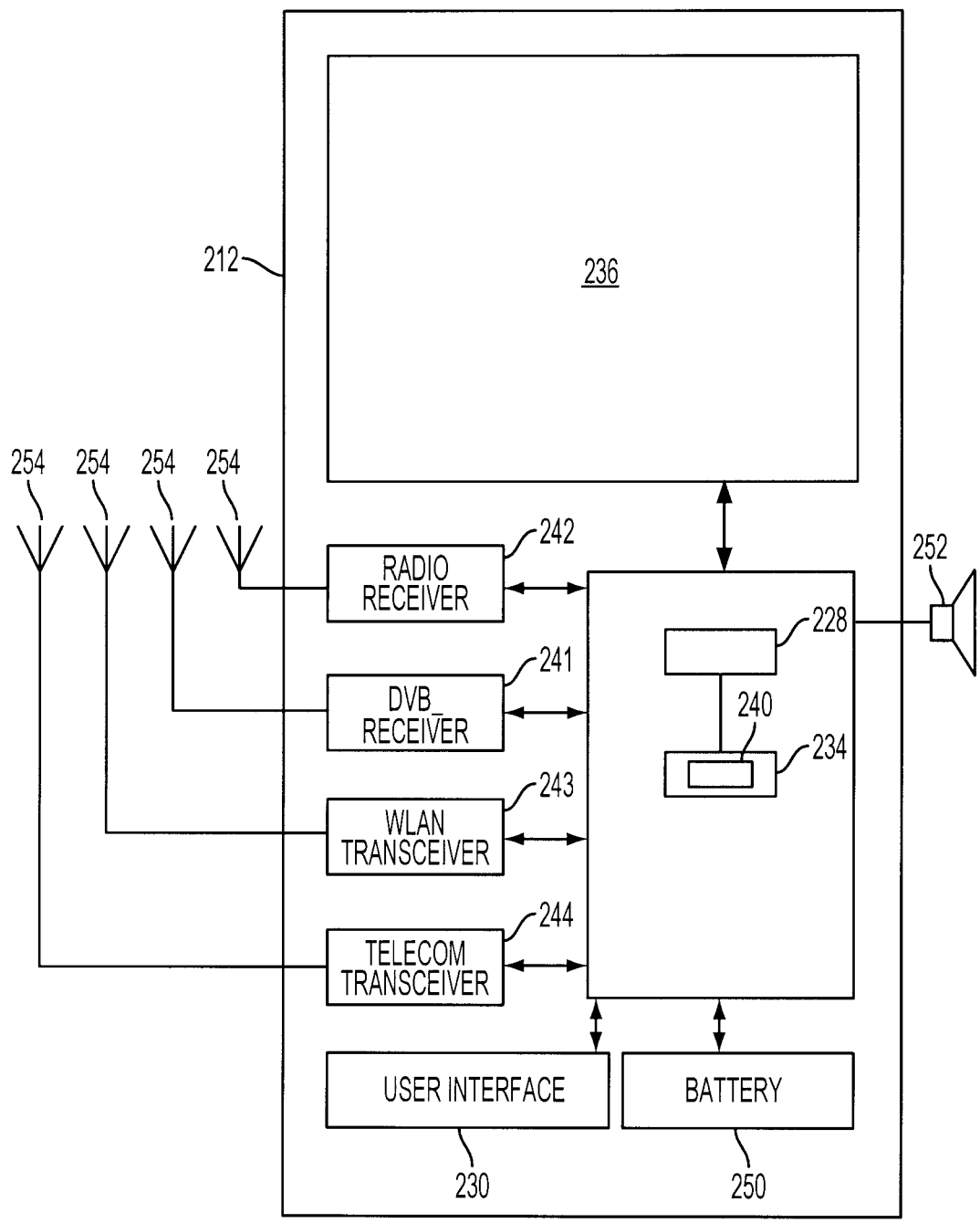
FIG. 2 illustrates a data processing architecture suitable for carrying out one or more illustrative aspects of the invention.

FIG. 2 illustrates a generic computing device 212, e.g., a desktop computer, laptop computer, notebook computer, network server, portable computing device, personal digital assistant, smart phone, mobile telephone, cellular telephone (cell phone), terminal, distributed computing network device, mobile media device, or any other device having the requisite components or abilities to operate as described herein. As shown in FIG. 2, device 212 may include processor 228 connected to user interface 230, memory 234 and/or other storage, and display 236. Device 212 may also include battery 250, speaker 252 and antennas 254. User interface 230 may further include a keypad, touch screen, voice interface, four arrow keys, joy-stick, stylus, data glove, mouse, roller ball, touch screen, or the like. In addition, user interface 230 may include the entirety of or portion of display 236.

Computer executable instructions and data used by processor 228 and other components within device 212 may be stored in a computer readable memory 234. The memory may be implemented with any combination of read only memory modules or random access memory modules, optionally including both volatile and nonvolatile memory. Software 240 may be stored within memory 234 and/or storage to provide instructions to processor 228 for enabling device 212 to perform various functions. Alternatively, some or all of the computer executable instructions may be embodied in hardware or firmware (not shown).

Furthermore, the computing device 212 may include additional hardware, software and/or firmware to support one or more aspects of the invention as described herein. For example, computing device 212 may include a camera (not shown) and/or audiovisual (e.g., movie/film) support software/firmware. Device 212 may be configured to receive, decode and process digital broadband broadcast transmissions that are based, for example, on the Digital Video Broadcast (DVB) standard, such as DVB-H, DVB-T or DVB-MHP, through a specific DVB receiver 241. Digital Audio Broadcasting/Digital Multimedia Broadcasting (DAB/DMB) may also be used to convey television, video, radio, and data. The mobile device may also include other types of receivers for digital broadband broadcast transmissions. Additionally, device 212 may also be configured to receive, decode and process transmissions through FM/AM Radio receiver 242, WLAN transceiver 243, and telecommunications transceiver 244. In at least one embodiment of the invention, device 212 may receive radio data stream (RDS) messages.

Device 212 may use computer program product implementations including a series of computer instructions fixed either on a tangible medium, such as a computer readable storage medium (e.g., a diskette, CD-ROM, ROM, DVD, fixed disk, etc.) or transmittable to computer device 212, via a modem or other interface device, such as a communications adapter connected to a network over a medium, which is either tangible (e.g., optical or analog communication lines) or implemented wirelessly (e.g., microwave, infrared, radio, or other transmission techniques). The series of computer instructions may embody all or part of the functionality with respect to the computer system, and can be written in a number of programming languages for use with many different computer architectures and/or operating systems, as would be readily appreciated by one of ordinary skill. The computer instructions may be stored in any memory device (e.g., memory 234), such as a semiconductor, magnetic, optical, or other memory device, and may be transmitted using any communications technology, such as optical infrared, microwave, or other transmission technology. Such a computer program product may be distributed as a removable storage medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Various embodiments of the invention may also be implemented as hardware, firmware or any combination of software (e.g., a computer program product), hardware and firmware. Moreover, the functionality as depicted may be located on a single physical computing entity, or may be divided between multiple computing entities.

In at least one embodiment, device 212 may include a mobile client implemented in a C-based, Java-based, Python-based, Flash-based or any other programming language for the Nokia® S60/S40 platform, or in Linux for the Nokia® Internet Tablets, such as N800 and N810, and/or other implementations. Device 212 may communicate with one or more servers over Wi-Fi, GSM, 3G, or other types of wired and/or wireless connections. Mobile and non-mobile operating systems (OS) may be used, such as Windows Mobile®, Palm® OS, Windows Vista® and the like. Other mobile and non-mobile devices and/or operating systems may also be used.

By way of introduction, aspects of the invention provide a traveler (e.g., a tourist) the ability to obtain the latest information available regarding a destination he (or she) intends to visit. The traveler may enter a destination he intends to visit into a computing platform (e.g., device 212). After inputting the destination, a start date and the duration of the trip may be requested. Thereafter, the computing platform may display photos, images, videos and/or any other media item types (e.g., text, audio, multimedia, graphics, animation, interactive video and the like) from the entered destination. Thereafter, the traveler may view photos, images, videos, and/or any other media item types and the like on his device 212 depicting various locations of interest at the entered destination, e.g., notable points of interest, museums, architecture, amusement parks, historical landmarks, monuments, etc. The material may be organized or ranked based on history, habits, or interests of the traveler, or based on collaborative filtering. The traveler may also access additional information in the form of textual and visual descriptions, visitor commentaries, reviews, and the like corresponding to the photos, images, videos, and/or any other media item types. The photos, images, videos, any other media item types and information may be filtered to (only) provide the traveler with points of interest that will be open when the user is scheduled to be located in proximity of the selected destination. The traveler may select from the photos, images, videos, and/or any other media item types those points of interest that he wants to see while visiting the destination. Each individual photo, image, video, or any other media item type may relate to a single candidate point of interest. Alternatively, or additionally, each individual photo, image, video, or any other media item type may contain multiple candidate points of interest, and a traveler may have an opportunity to select from the multiple candidate points of interest. The selection may, e.g., be based on the tourist's interest or schedule in visiting each depicted location. Aspects of the invention may then generate a route of travel for the tourist in the destination, whereby when the tourist follows the generated route of travel the tourist visits each location identified as being of interest to the tourist.

Figure 3:
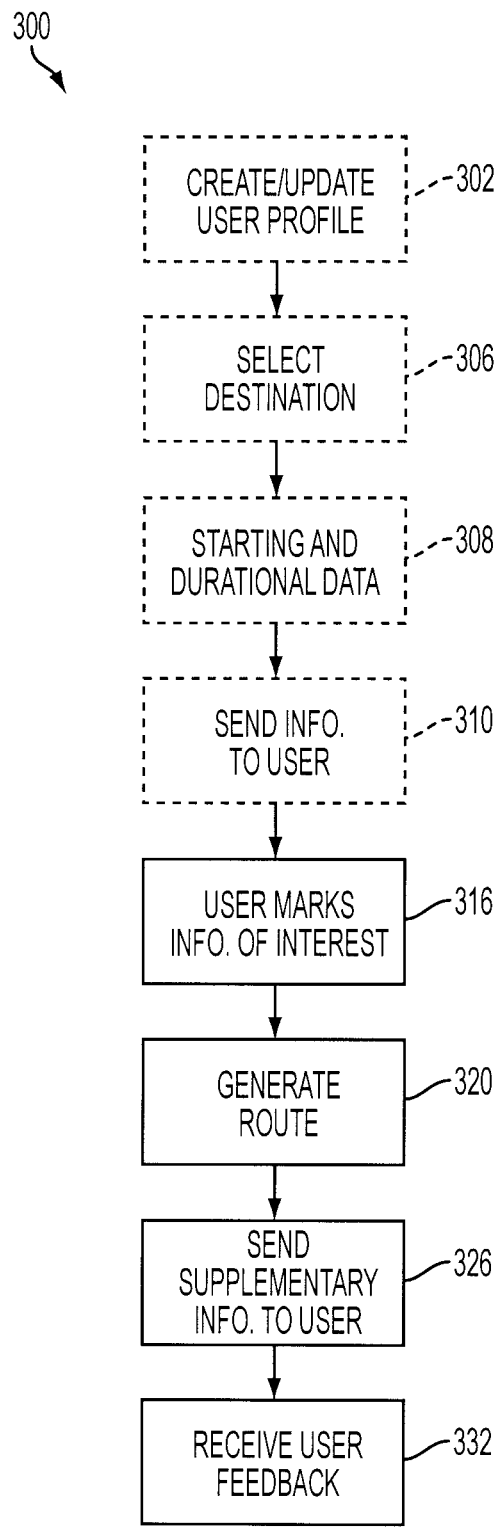
FIG. 3 illustrates a flow chart depicting a method suitable for carrying out one or more aspects of the invention.

FIG. 3 depicts a flow chart describing a method 300 suitable for carrying out one or more aspects of the invention as described herein. Method 300 may be executed on any suitable computing platform (e.g., computing device 212). More specifically, method 300 may be executed in conjunction within a (web) browser or the like, such as via a client/server, Java, Java Script, AJAX, applet, Flash®, Silverlight™, or other applications, operating systems, devices and the like.

In step 302, a user profile is created and/or updated. The user profile may include factual data specifically related to the user (e.g., the user's age, race, gender, contact information, personal identifiable information, etc.), activities the user likes to participate in (e.g., visiting science museums, amusement parks, nature, historical landmarks or preferences like more popular/non-popular sites, budget/luxury travel style), and the like. A user may take action to enter information/data into the user profile (e.g., via device 212), and the profile may be uploaded to a server or the like. Alternatively, or additionally, the user profile may be updated by the computing environment/system based on historical trips the user has taken and the routes he has followed while traveling in the past. For example, if on a past trip a user visited two amusement parks in a city, but ignored all historical museums in a given city, the system might draw an inference that the user enjoys amusement parks but not museums. Furthermore, the environment/system may remember (e.g., via a database) the types of attractions the user preferred while on his earlier trips. For example, a user who has an interest in science, might not care very much for sports. As such, the user may explicitly indicate a lack of interest in sports in his corresponding user profile. Alternatively, or additionally, the user's lack of interest in sports may be inferred based on his never having attended a sporting event on a previous trip, or based on stored heuristics rules, such as people who like science do not like sports, or based on collaborative filtering. Furthermore, the user may have an opportunity to express an interest in engaging in an activity different from those activities that the user engaged in on previous trips. Method 300 may take into account the user's most recent travels to suggest an activity that likely would appeal to the user, despite the user never having engaged in the activity previously.

In step 306, the user may select a destination of interest. For example, a user may enter "Washington, D.C." into his device 212 as a destination that he intends to travel to. The selection may be made by explicit user input, selected on a map, voice recognition, airport selection, or any other known selection technique. Alternatively, or additionally, the selection may be made implicitly. For example, a photo, image, video or any other media item type may be displayed on device 212, and a user viewing the photo, image, video or any other media item type may desire to visit the subject matter depicted therein. As such, the user may indicate his interest by providing device 212 with an input (e.g., via actuation of a button). Responsive to the input, device 212 may select the destination of interest based on the location of the subject matter contained in the photo, image, video or any other media item type. The photo, image, video or any other media item type may be geo-tagged to correlate the subject matter contained in the photo, image, video or any other media item type with the identification of the destination of interest.

In step 308, the user may enter information related to the details/specifics of the trip. For example, the user may enter a starting date/time and/or the duration of the trip. Other constraints may be specified by the user, such as travel routes the user wishes to avoid and the like. The information provided in step 308 may narrow or expand the pool of candidate points of interest provided in step 310 discussed below. This information may be fetched automatically from a user's stored calendar of events. Alternatively, or additionally, the information may be retrieved from an e-tickets/e-check-in confirmation message the user has received on his device as an e-mail, Short Message Service (SMS) message, Multimedia Messaging Service (MMS) message, etc.

In step 310, information may be sent to the user regarding the destination entered in step 306 and the information supplied in step 308. For example, the user may acquire information regarding points of interest in Washington, D.C. The information may take the form of textual documents, user blogs, geo-tagged photos, images, videos, and any other media item types, and the like. The information may be presented at any level of granularity. For example, the information may be presented at a city-level (e.g., Washington, D.C.). Alternatively, the information may be presented based on overall interests, allowing the user to choose his destination based on the attractions available; for example, a user interested in visiting Washington, D.C. may be presented with information regarding the Smithsonian, the Lincoln Memorial, the White House, the Washington Monument, and the like.

In step 316, the user marks the information that is of interest to him from the corresponding information that was sent to him in step 310. For example, after the user viewed photos, images, videos, and any other media item types of museums, the user may express an interest in visiting the Smithsonian and the White House, but might indicate that he is not interested in visiting the Lincoln Memorial, either by explicitly marking a site (e.g., the Lincoln Memorial) as not interesting or implicitly by selecting the next or previous site.

In step 320, one or more (travel) routes may be generated for the user based on the information marked in step 316. The one or more routes may include walking/driving directions and the like. The one or more routes may take into account a temporal component based on the user's travel plans. For example, the user might only intend to visit Washington, D.C. for one day. As such, the user may first be directed to the Smithsonian Air and Space Exhibit upon his arrival in Washington, D.C. at 2:30 P.M., so that he can take in all the museum has to offer prior to it closing for the day. Thereafter, the user may be directed via one or more generated travel routes to the White House at 8:00 P.M. where he will be able to take numerous photos of the White House at dusk (or other appropriate time calculated based on the expected time of sunset that day). The one or more routes may be adjusted based on changing conditions/circumstances. For example, the user may have intended to arrive in Washington, D.C. at 10:00 A.M., and the original routes may have recommended that the user visit the White House prior to the Smithsonian. But the user's arrival may have been delayed due to airport/airline delays, travel delays, construction and/or road closures, and the routes may have been adjusted to account for this unexpected delay. The adjustment to the one or more routes may take place in conjunction with a user calendar, thereby enabling a user to traverse the routes based on the calendar. The user may also be reminded that he typically likes to eat dinner at 6:30 PM, and a restaurant of interest located in between the Smithsonian and the White House may be recommended to the user while the user is traveling from the Smithsonian to the White House. The restaurant may be selected based on a user's preferences and history, other users'/community/commercial reviews, commentaries, ratings, web blogs, or the like.

In step 326, when the user is traversing the route generated in step 320, the computing environment/system may supplement the information provided to the user. For example, while the user is driving in his car near the Jefferson Memorial in Washington, D.C., the user may be provided with audio, video and/or textual commentary regarding Jefferson's role in the drafting of the Declaration of Independence. The user's location may be determined based on location-tracking equipment (not shown) installed in the user's device 212. The location-tracking equipment may be configured to guide the user along a route using a navigational method for indoor/outdoor positioning. The location-tracking equipment may include GPS equipment embodied as hardware, software, firmware, or some combination thereof. For example, WLAN or Bluetooth positioning, RFID tags, and the like may be used to facilitate location-tracking. Thereafter, when the user arrives at the Smithsonian in Washington, D.C., the user may receive additional informational content regarding the Smithsonian from a web service, such as Wikipedia, wikitravel.org, wikimapia.org, Lonely Planet, and the like. The user may be able to engage in a chat or instant messaging (IM) session with other users to obtain additional information.

In step 332, the user may provide feedback indicating whether he found the destination to be of interest. The feedback may take the form of a general ranking system (e.g., a rating on a scale of one to ten), or it may incorporate the opportunity to provide more detailed user commentary. The feedback may be made available to other users by placing the feedback in a community pool of information. For example, the user may have enjoyed his time at the Smithsonian, but wished that the exhibits related to flight afforded more interactive opportunities. The user may rate the Smithsonian an 'eight' as far as museums go, and may lament the limited number of interactive opportunities in a corresponding web blog or the like. Thereafter, other community members/users may obtain access to the user's comments or rankings to decide whether they want to visit the Smithsonian.

User feedback may be explicit, as described above, or may be implicitly gathered based on where the user did or did not go. For example, based on the GPS location monitoring, the system may determine that the user did not visit the White House, even though the user indicated that the White House was a location of interest. Instead, the system may detect that the user visited the International Spy Museum based on GPS location monitoring. The system may use the knowledge to update the user's likes and dislikes on his profile.

Method 300 is illustrative, and it is to be understood that modifications may be made without departing from the spirit and scope of the method. For example, one or more routes (e.g., step 320) may be sent to the user prior to a user marking information of interest (e.g., step 316). This may be particularly beneficial in an instance where a person may have a handicap or physical limitations that may impose constraints on the types of activities, and hence, information, that may be of interest to the user. Furthermore, a number of steps may be optional; steps 302, 306, 308 and 310 are shown as dashed boxes to convey the optional nature of these steps.

A user may be in a foreign city and may view on a computing platform (e.g., device 212) images or photos of sites, places of interest, and the like. The images or photos may be taken with device 212, or may be received via a network service or the like. The user may indicate a desire to be provided with a navigational route to the depicted sites/places starting from her current location. A travel route (e.g., a walking, cycling, and/or driving route) may be generated and subsequently displayed on device 212. As such, a user might not be required to enter a destination explicitly (e.g., step 306); rather, the destination may be deduced or inferred from the photos or images, or from the device's current location. The photos or images may contain embedded metadata, information, or the like to assist in generating the travel route. Alternatively, or additionally, the photos or images may be incorporated as a part of a larger service.

A user may also plan a travel route or itinerary based on audio information. For example, a user while traveling in England may be presented with music content (e.g., in the form of mp3 files, streaming music, and the like) via a web service. The nature of the music content may be in accordance with a promotion, advertisement, or the like related to upcoming musical performances by the artists of the music content. The user may access the web service using a mobile device (e.g., device 212), and the music content may be presented to the user over a given time span (e.g., the next day, the next seven days, the next 30 days, etc.). The user may then be able to indicate via device 212 an interest in the music content and/or the artists. The user's interest may be indicated by pressing a button on the device 212, touching a user interface, speaking into a microphone of device 212, or the like. Thereafter, device 212 may present to the user (via a display on device 212) a travel route or the like, thereby providing instructions to an event, concern hall, theatre, or the like. The events, while described in the context of a musical performance, could include any such performances such as poetry recitals, debates and the like.

Figure 4:
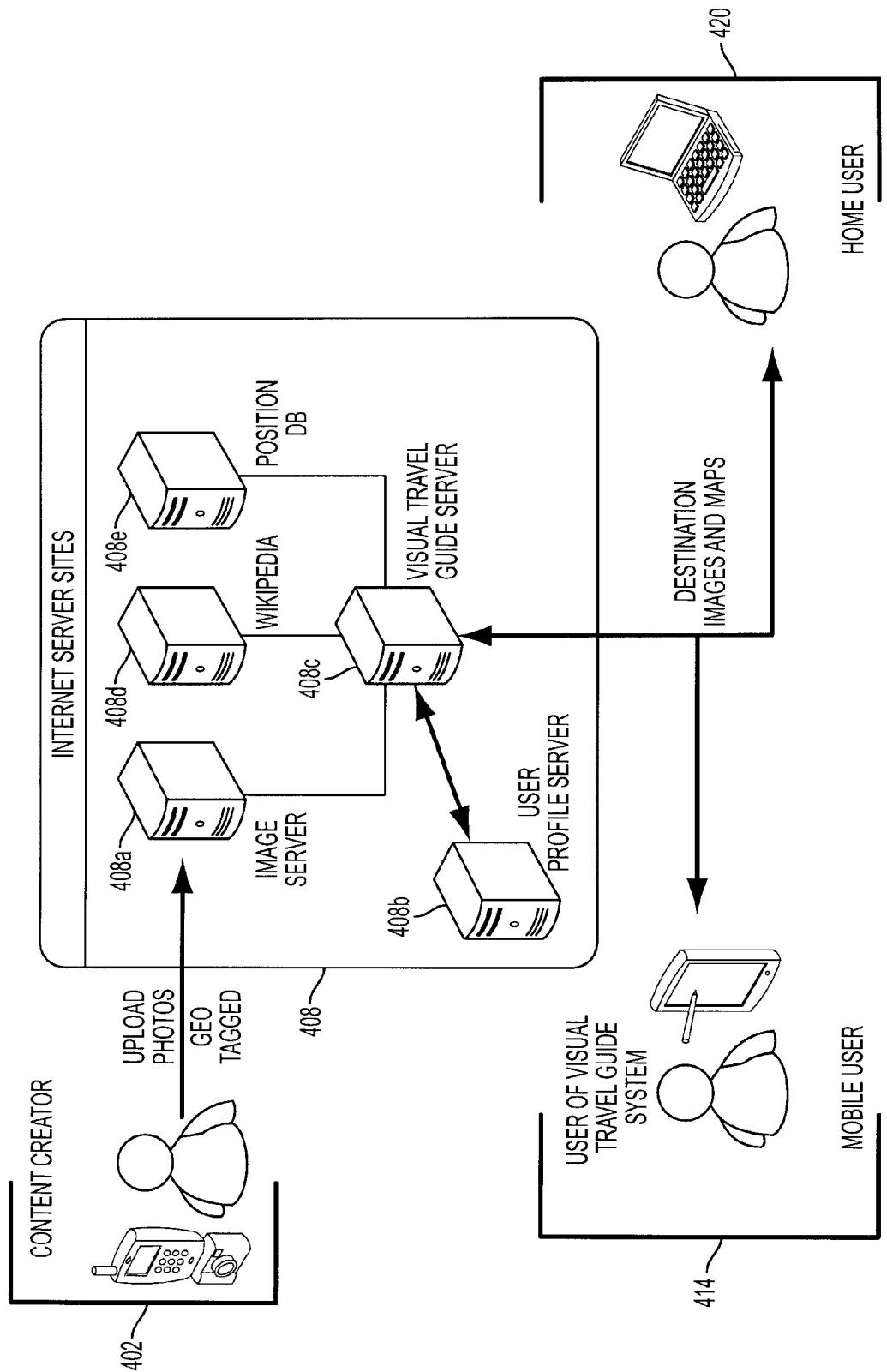
FIG. 4 illustrates a use case scene wherein one or more illustrative aspects of the invention may be practiced.

FIG. 4 illustrates in block diagram form a network architecture usable to practice one or more aspects of the invention. A content creator 402 may upload content to internet server sites 408. The content may include geo-tagged photos, videos and any other media item types as shown, and the photos, videos and any other media item types may be uploaded to an image, video and/or any other media item type server 408a. Internet server sites 408 may include one or more servers/databases each dedicated to a specified function. For example, as shown in FIG. 4, internet server sites 408 includes image, video and any other media item type server 408a, user profile server 408b, visual travel guide server 408c, Wikipedia/Wikitravel/Lonely Planet/etc. server 408d, and position database (DB) 408e. There may also be one or more separate map tile servers (not shown), such as from Google Maps®, Microsoft Live Maps®, or the like. User profile server 408b may store profile data/information related to users' interests. Visual travel guide server 408c may be used to convey information (e.g., destination photos, images, videos, any other media item types and maps) to users. Wikipedia/Wikitravel/Lonely Planet/etc. server 408d may be used to pool textual/descriptive information regarding various sites and locations. Position DB 408e may be used to keep coordinate information regarding various destinations, user locations, points of interest, and the like. For example, in relation to the aforementioned discussion regarding the PTO, the location of the PTO may be maintained based on its latitudinal and longitudinal coordinates. Regarding the aforementioned discussion regarding the relocation of the PTO from Crystal City, Va. to Alexandria, Va., position DB 408e may be updated to reflect the latest PTO coordinates, accordingly. The servers/databases (408a-408e) included as part of internet server sites 408 may be discrete entities as depicted, or alternatively, they may be consolidated into one or more computing platforms. A dedicated server may be provided to a traveling-oriented community, wherein content is created and tagged with location data and categorized/classified according to the subject matter of the content. Alternatively, one or more server components may serve as a gateway to access and extract photos, images, videos and any other media item types from other services.

Referring to FIG. 4, a user 414 of the visual travel guide system described herein obtains access to destination photos, images, videos, any other media item types and maps via the visual travel guide server. The destination photos, images, videos, any other media item types and maps may be sent to the user in accordance with the method described in conjunction with FIG. 3. FIG. 4 also shows a scenario in which the destination photos, images, videos, any other media item types, and maps may be sent to a home user computer 420. Home user computer 420 may or may not belong to the same user 414. The destination photos, images, videos, any other media item types, and maps may be sent to the computing platforms based on a common user account. Alternatively, a user of the visual travel guide system described herein may specify one or more persons who should obtain access rights to the transmitted/distributed information. As shown via the dual arrow head connecting visual travel guide server 408c with user 414 and home user computer 420, user 414 and/or home user computer 420 may provide feedback (e.g., step 332) to visual travel guide server 408c.

Figure 5:
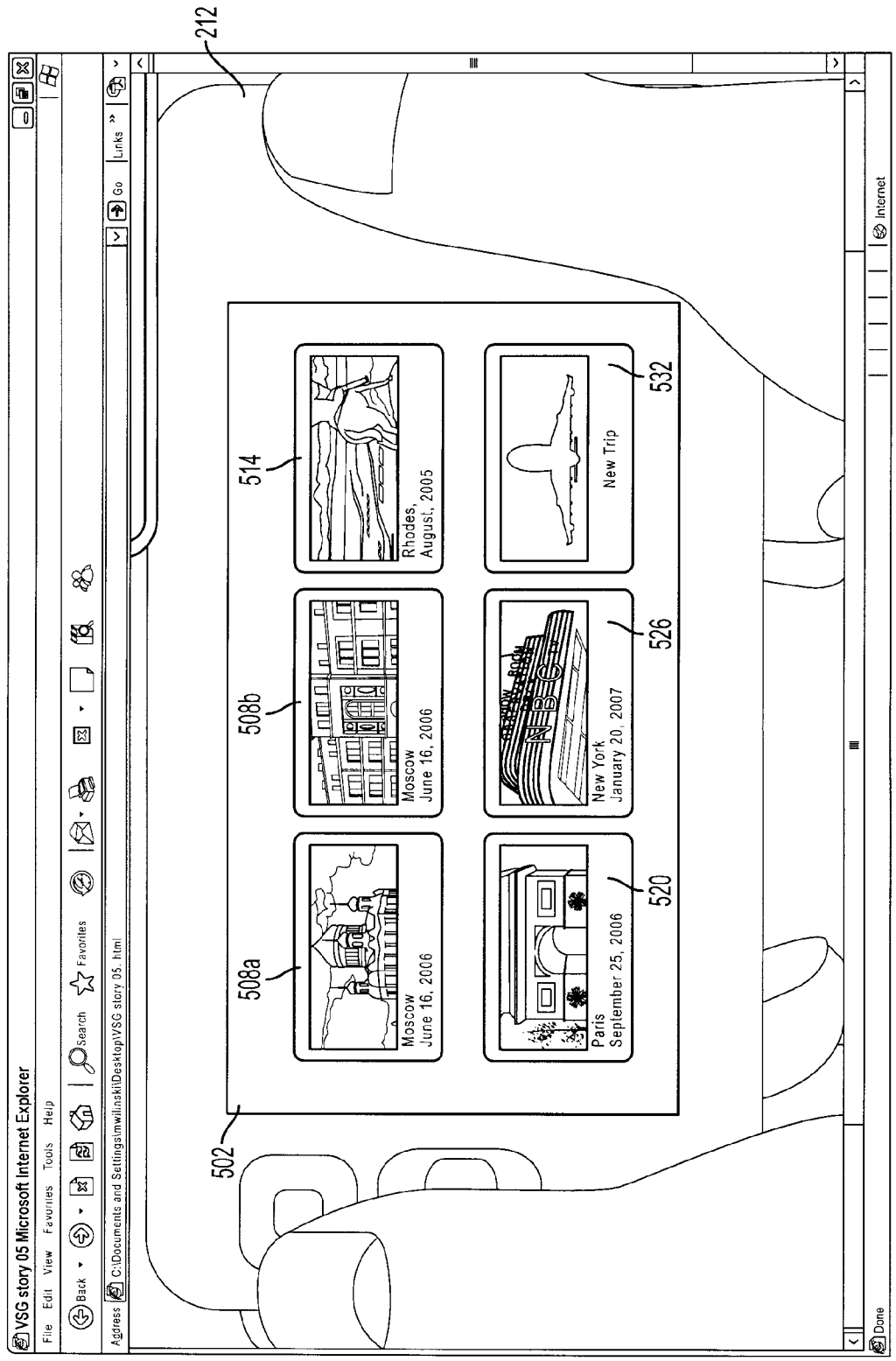
FIGS. 5 through 11 illustrate a use case scenario wherein one or more illustrative aspects of the invention may be practiced.

Referring to FIG. 5, a use case scenario is depicted wherein a user, with a handheld device (e.g., device 212) has called up on the display of the handheld device a travel menu 502. Travel menu 502 as shown presents in graphical display form pictures, videos, any other media item types, and descriptions of various sites that the user has visited in the past. Elements 508a and 508b show that the user visited two different sites in Moscow on Jun. 16, 2006. Element 514 depicts that the user visited the island of Rhodes, Greece in August, 2005. Element 520 shows that the user visited Paris, France on Sep. 25, 2006, and element 526 shows that the user visited New York, N.Y. on Jan. 20, 2007. Element 532 allows the user to plan a new trip. The display of the various elements may be altered based on a variety of factors. For example, the elements (e.g., elements 508-532) may be presented in reverse chronological order, showing the most recent trip the user has taken first. Alternatively, the elements may be presented based on those trips that the user found most interesting or enjoyable. Additional schemes for displaying the elements are well within the scope and spirit of the present invention. A user can select a past trip to review images and information regarding that trip. Alternatively, a user can select element 532 to plan a new trip. Travel menu 502 may be configured to display upcoming trips (e.g., trips that the user has already created and planned and scheduled to take place at a future point in time). Travel menu 502 may dynamically display and/or update a currently active trip based on a device's (e.g., device 212's) clock.

Figure 6:
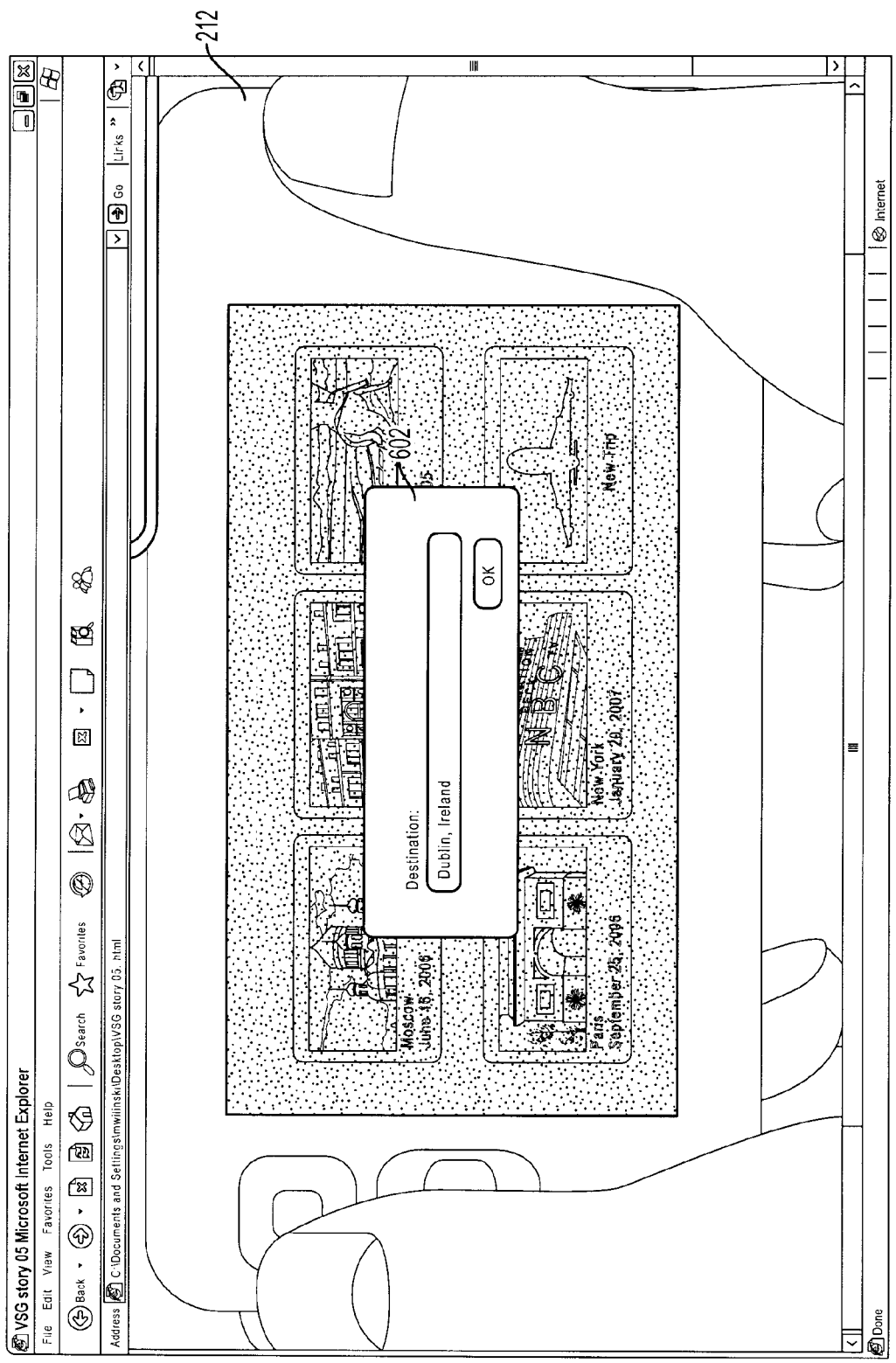

Referring to FIG. 6, after the user selected element 532 "New Trip" in FIG. 5, a text box 602 may be displayed requesting the user to enter a destination. As shown in FIG. 6, the user has entered "Dublin, Ireland" into text box 602. The method of entering the destination may take place in accordance with practices that are well known in the art. For example, device 212 may be configured to present a soft keyboard to support the data entry. Alternatively, device 212 may enter electronic ink via a stylus or the like. The user may also select a location from a world map. The user may thereafter depress the "OK" soft-key included in text box 602 to confirm the entry. The user may then enter information related to the details/specifics of the trip (e.g., step 308) such as a starting date/time, the duration of the trip, and other such constraints.

Figure 7:
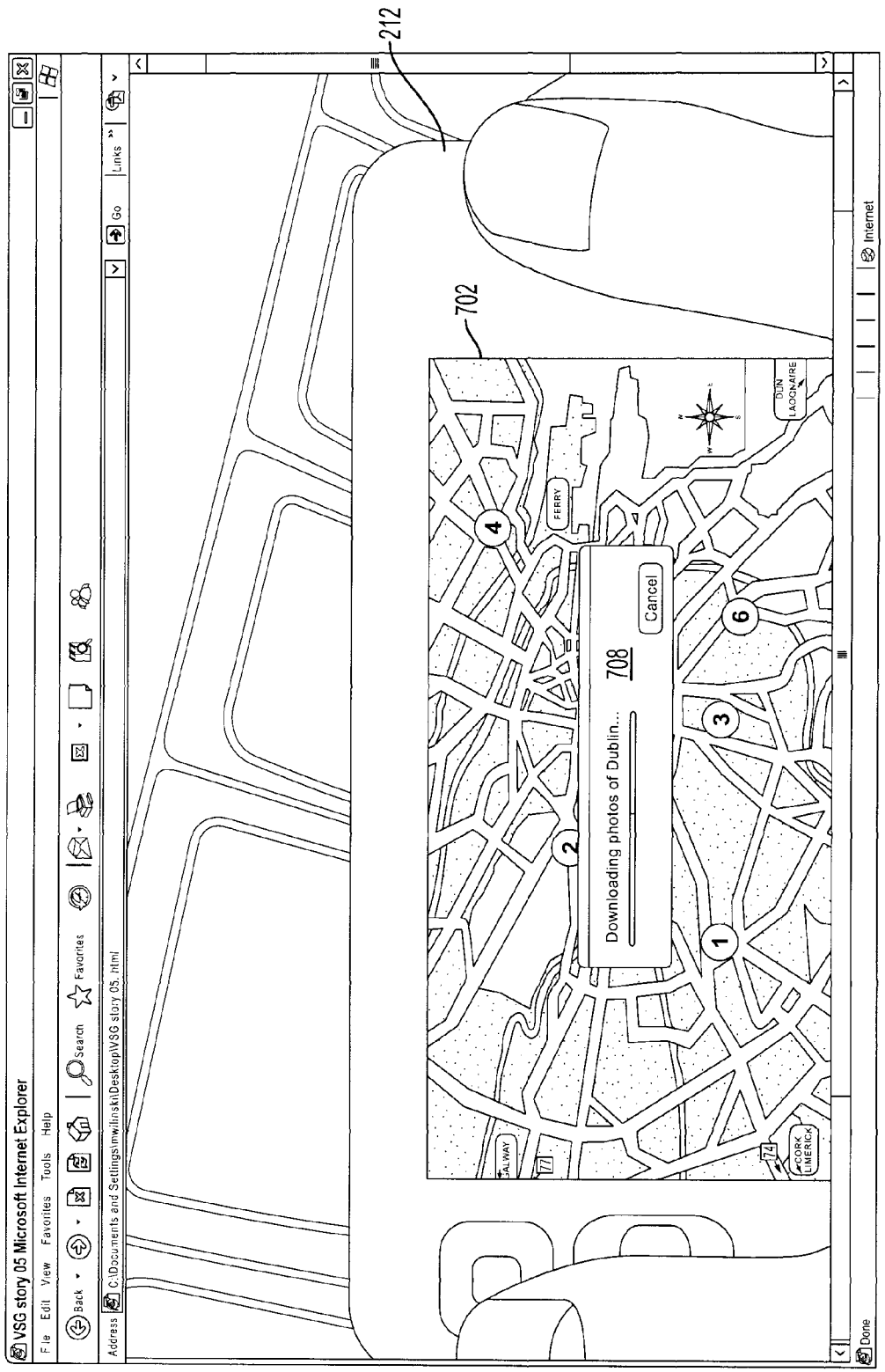

As shown in FIG. 7, the system next shows a map 702 of Dublin, Ireland on the display of device 212 responsive to the user having confirmed selection of Dublin, Ireland via the "OK" soft-key in text box 602 of FIG. 6. As shown in display box 708, a message is displayed stating that photos of Dublin are being downloaded to device 212, and a status bar graph is given to show the status of the download. In the background, map 702 may be supplemented with the photos, videos, and any other media item types as they are downloaded by device 212 to provide the user with further confirmation that the download is successful and ongoing.

Figure 8A:
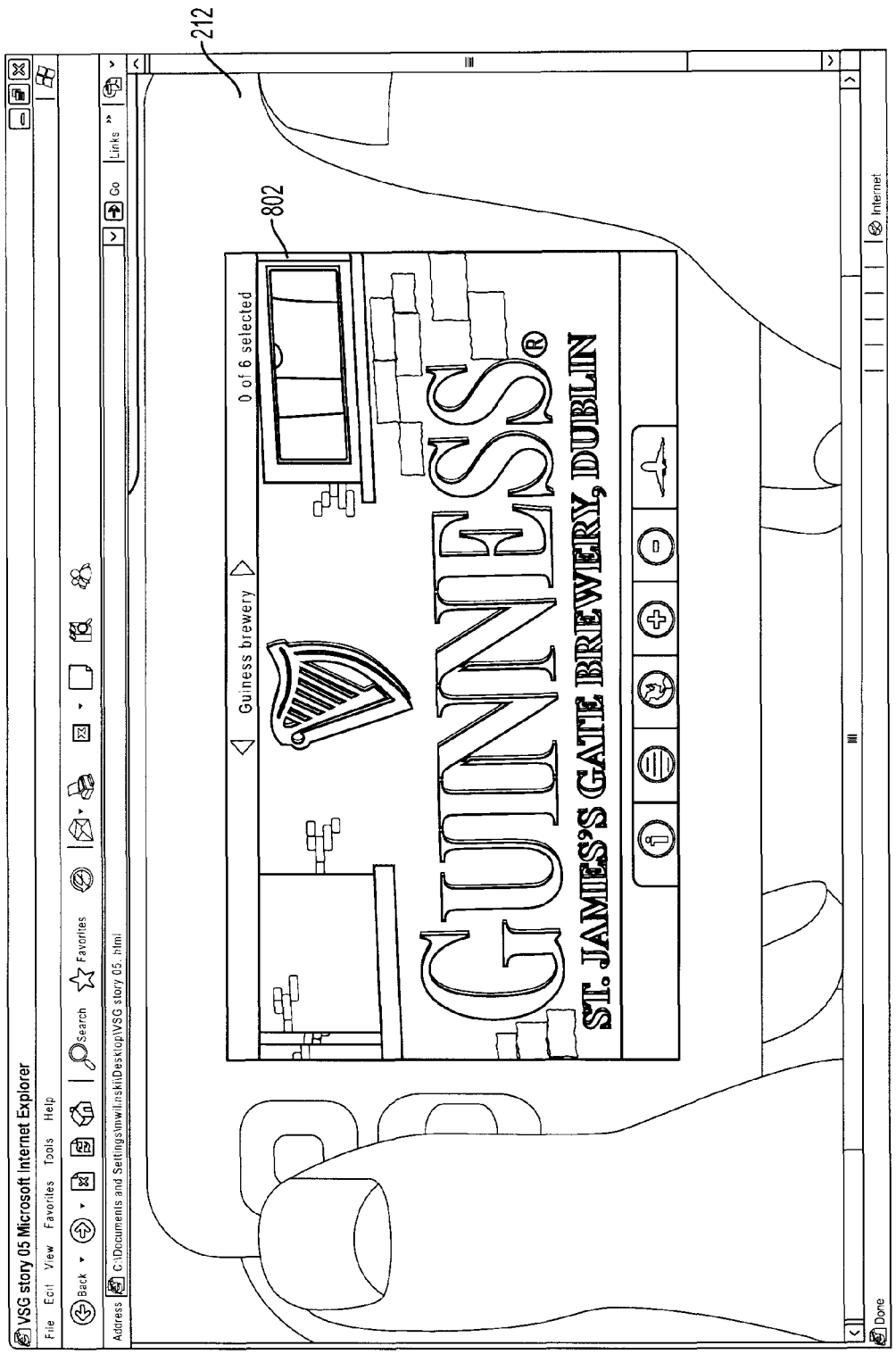
Figure 8B:
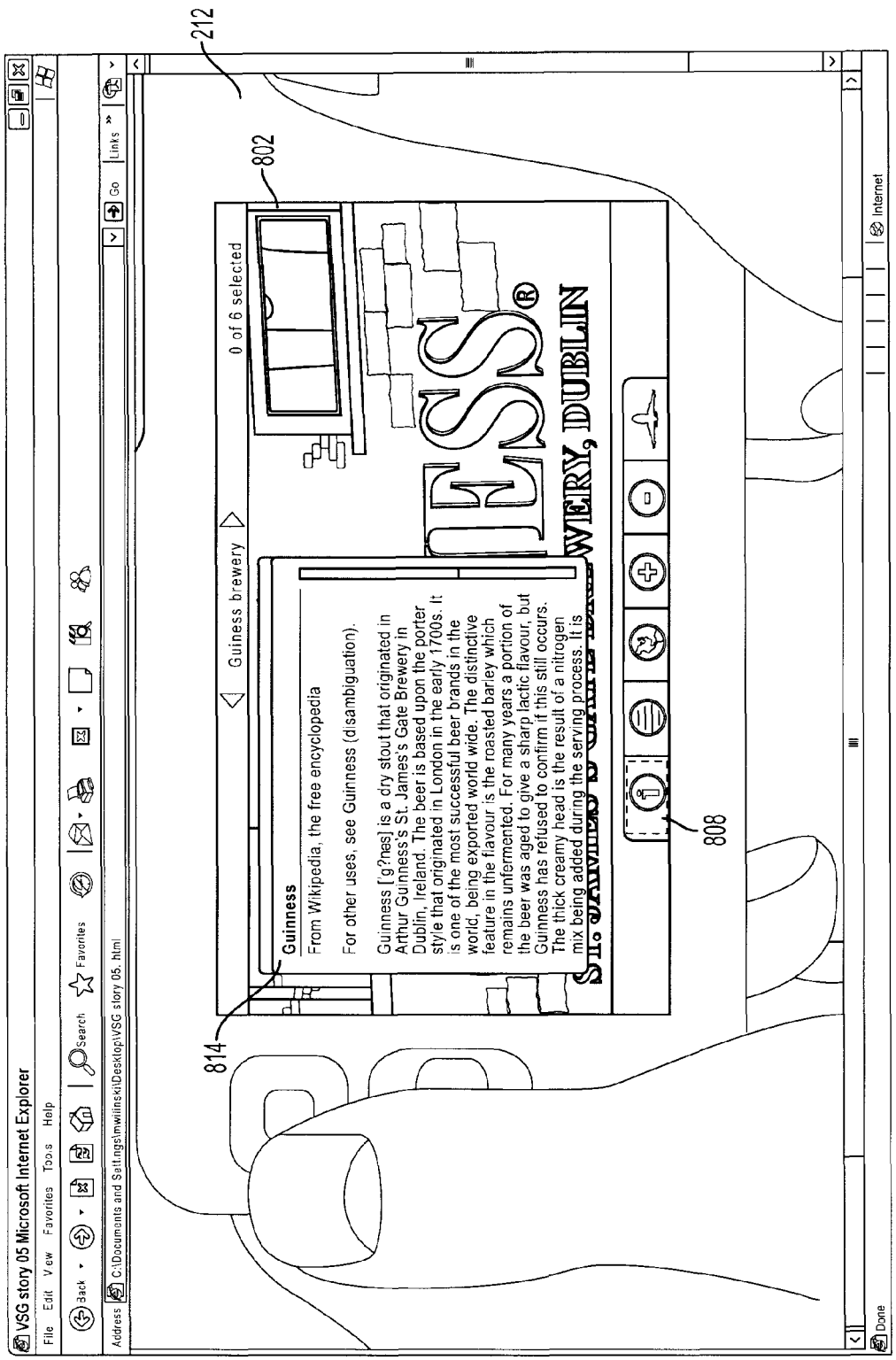
Figure 9:
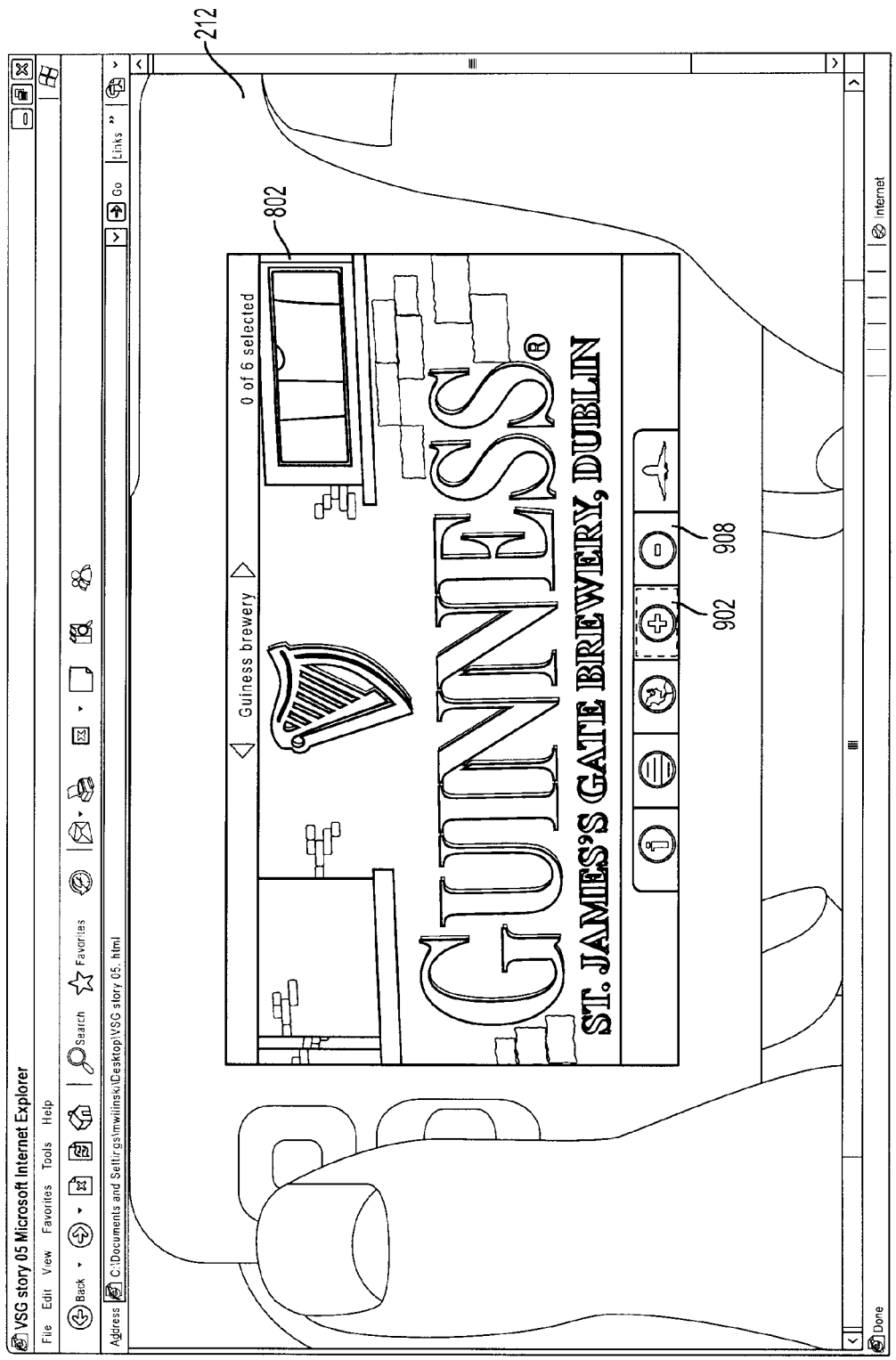

FIG. 8A shows a first photo 802 for the user to select whether or not the location is of interest to the user. Here, the first photo is of the Guinness Brewery, as the Guinness Brewery may be a candidate point of interest. Instead of, or as an addition to the photo, a video clip or any other media item type may be shown/displayed. The user of device 212 may have an interest in how beer is made, but may be uncertain whether he wants to visit the Guinness Brewery. More specifically, the user may want more information about the Guinness Brewery before deciding whether to visit it. As shown in FIG. 8B, the user may depress "information" soft-key 808 that may generate a page overlay 814. Page overlay 814 may be taken from Wikipedia as shown, or from any database of information accessible by the system. Other informational sources are well within the scope and spirit of the present invention. After reading the information from page overlay 814, a user may depress soft-key 902 "+" as shown in FIG. 9 to confirm an interest in visiting the depicted place (e.g., Guinness Brewery). Alternatively, or additionally, the user may press soft-key 908 "−" to indicate a lack of interest in the depicted place (e.g., Guinness Brewery). Instead of depressing soft-key 908 "−", the user could just press a "next site" button (not shown), which may be interpreted as a lack of interest by the user, or that the user wants to think about visiting the depicted site and may want to be presented with the photo at some point in the future. After selection of either key 902 or key 908 (or the "next site" button), the system proceeds to the next photo, as shown in FIG. 10A, or instead of a photo to a next video or any other media item type.

Figure 10A:
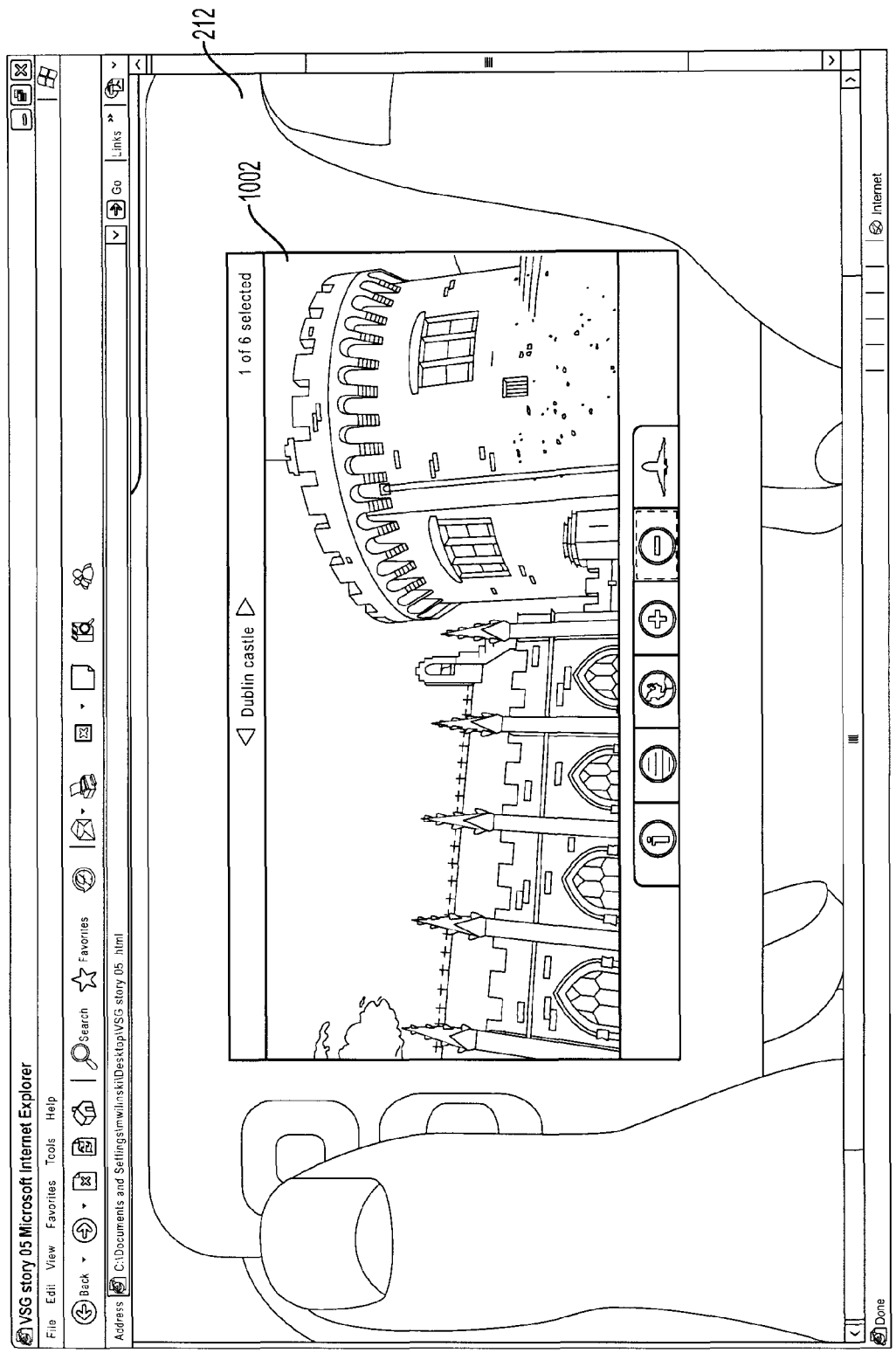
Figure 10B:
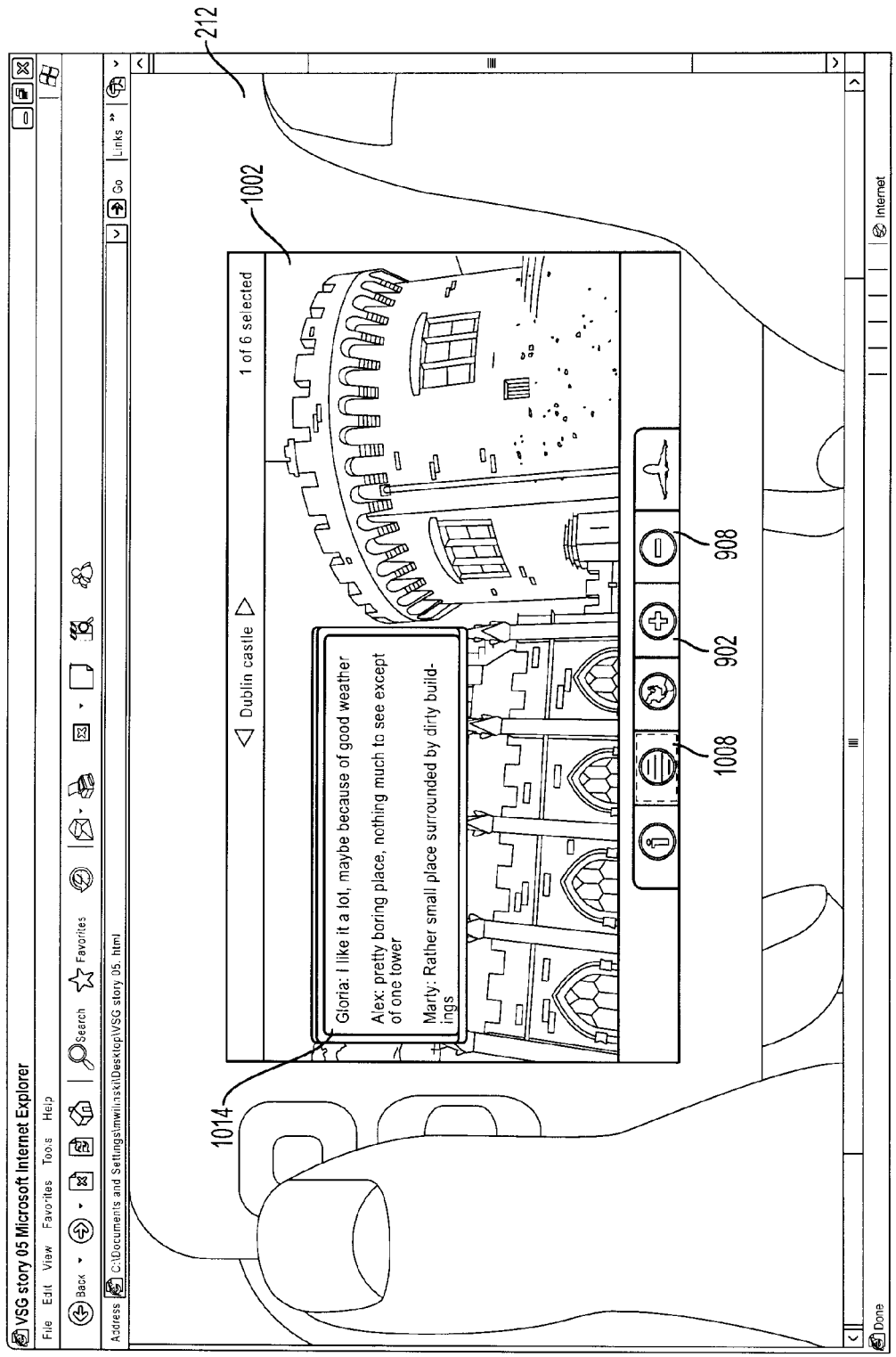

FIG. 10A shows a second photo 1002 of a potential location of interest. Here, the photo is of Dublin Castle. The user may be indecisive as to whether he wants to visit Dublin Castle. As such, as shown in FIG. 10B, the user may depress soft-key 1008 "blog-lines" to obtain user comments 1014 regarding the Dublin Castle depicted in photo 1002. The comments may be taken from a user community pool, blog, or similar user-based resource. The user may, based on comments 1014, use soft-key 902 "+" to confirm an interest in the depicted Dublin Castle 1002, or alternatively, indicate a lack of interest using soft-key 908 "−". The user may continue to review other points of interest based on subsequent geo-tagged images displayed on the device, and either select or reject each associated location based on the displayed images. For each site or point of interest, there may be multiple photos, images, videos, and/or any other media item types present (e.g., the same site or point of interest may be presented from a different shooting angle or position, different season or time of the day, etc.). The user may be initially presented with a default photo, image, video or any other media item type and may be provided with the ability to browse the additional/supplemental photos, images, videos and any other media item types.

Figure 11:
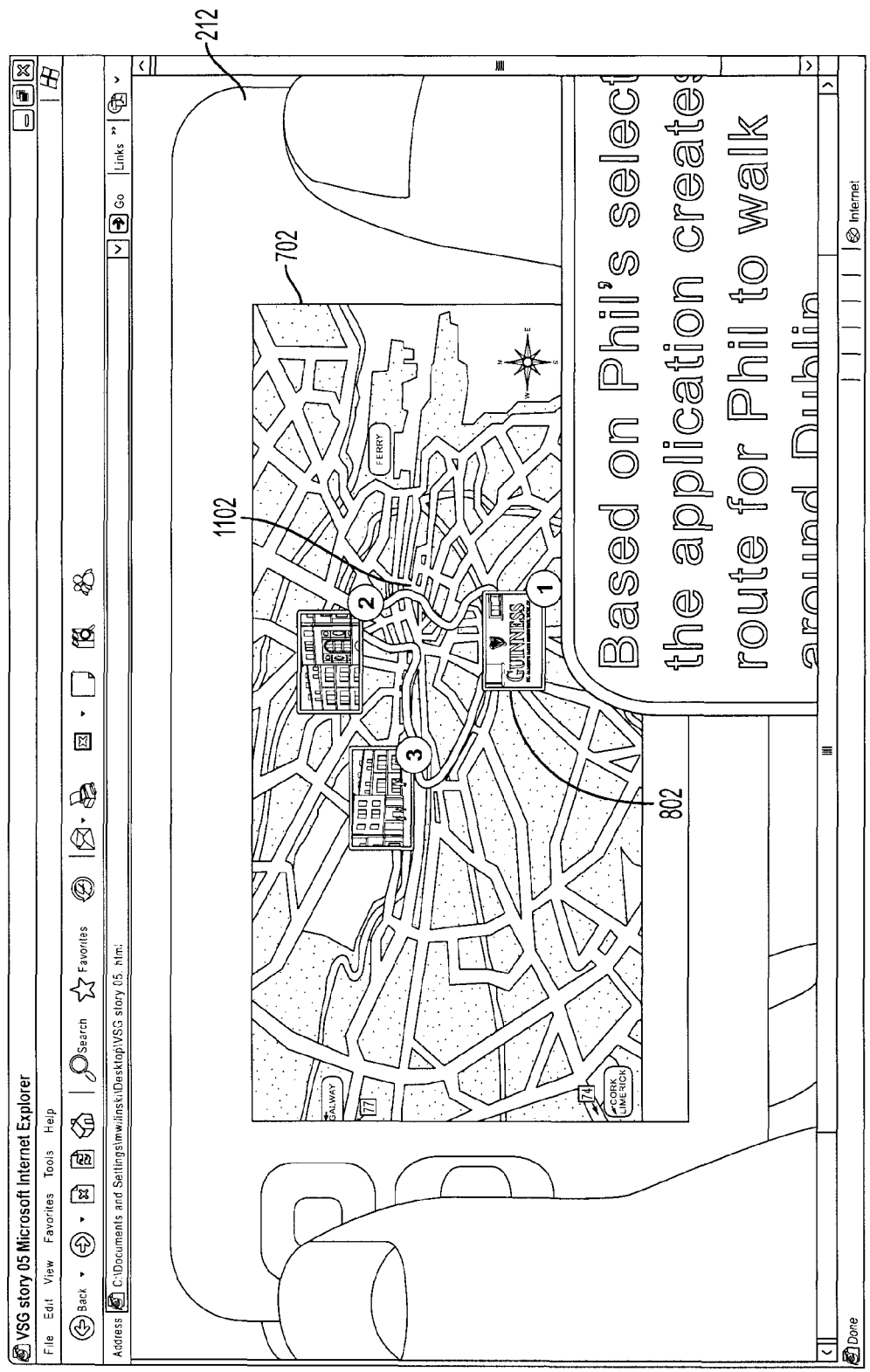

FIG. 11 depicts a scenario wherein a user has traversed all the candidate photos that may have been of potential interest to the user, and thereafter, map 702 of Dublin, Ireland is restored on the display of device 212 with a proposed travel route 1102. FIG. 11 shows travel route 1102 overlaid on top of map 702. Travel route 1102 provides directions (e.g, walking direction, driving directions, and/or the like) to the user based on the location(s) the user selected (via soft-key 902 "+") as points of interest. Travel route 1102 as shown includes three places of interest, numbered one through three, and the user is advised to begin his travels at place of interest #1, proceed to place of interest #2, and conclude at place of interest #3. Travel route 1102 may also be supplemented with the photos (e.g., photo 802 of the Guinness Brewery), videos, or any other media item types the user viewed when selecting the points of interest as shown in FIG. 11, thereby serving as a graphic reminder of why the user chose the selected points of interest. Travel route 1102 may be generated by a server or the like. Alternatively, or additionally, travel route 1102 may be generated by device 212.

The user can travel through a proposed route (e.g., travel route 1102) using GPS functionality on mobile device (e.g., device 212). Also, the user can manually change the route proposal, e.g., add new sites or remove selected/proposed sites. Also sites can be removed from the trip itinerary automatically based on the user's actions. For example, if a user deviates from the proposed route and misses a suggested site, the next site in the itinerary may be presented.

Generated travel routes (e.g. travel route 1102) may include multiple sub-travel routes to get from a first point of interest location to a second point of interest location. The multiple sub-travel routes may be generated based on travel conditions (e.g., road construction), site visiting hours, and the like. Alternatively, or additionally, the multiple sub-travel routes may be generated in accordance with a user profile detailing the user's interests, a history of the user's past travels, collaborative filtering, and the like. Furthermore, it is possible that a user has selected too many points of interest (e.g., via soft-key 902 "+") given the durational constraints the user has entered (e.g., step 308). As such, device 212 may generate a warning message or the like indicating to the user that the user has likely selected an excess number of activities. Device 212 may prioritize the selected activities based on the user profile, past travels, collaborative filtering, or the like. Alternatively, or additionally, device 212 may request the user to remove some of the selected activities. Furthermore, device 212 may recommend to the user to extend the duration of the trip by a number of additional days, in which case, device 212 may present travel routes appropriate to any given day. For example, a user may select a destination and sites he wants to see, and then device 212 may calculate how long the trip will need to be in order to see all the sites.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

identifying a geographical destination;

receiving at a computing platform a plurality of media items related to a plurality of candidate points of interest within a proximal distance of the identified geographical destination, wherein the plurality of media items are received based on temporal characteristics associated with the plurality of candidate points of interest;

presenting at the computing platform the plurality of media items;

receiving at the computing platform a selection of at least two of the plurality of media items; and displaying via the computing platform a travel route through at least two points of interest associated with the selection of the at least two of the plurality of media items.

2. The method of claim 1, wherein the plurality of media items comprise items taken or created by at least one member of a user community or a commercial content provider.

3. The method of claim 1, wherein the selection of the at least two of the plurality of media items is based on either a user profile comprising past travels of a corresponding user or collaborative filtering.

4. The method of claim 1, wherein the geographical destination is identified based on a current location of the computing platform.

5. The method of claim 1, further comprising:

providing supplementary information with the plurality of media items related to the plurality of candidate points of interest within a proximal distance of the identified geographical destination; and presenting the supplementary information on the computing platform responsive to a user input.

6. The method of claim 5, wherein the supplementary information comprises informational text describing the associated candidate point of interest.

7. The method of claim 5, wherein the supplementary information comprises user comments about the associated candidate point of interest.

8. The method of claim 1, wherein the method further comprises sending feedback from the computing platform, wherein said feedback includes a user opinion associated with at least two of the plurality of media items.

9. The method of claim 1, wherein the receiving at the computing platform of the selection of at least two of the plurality of media items comprises acceptance or rejection of each of the plurality of media items.

10. An apparatus comprising:

a processor; and a memory configured to store computer readable instructions that, when executed by the processor, cause the apparatus to:

identify a geographical location;

receive a plurality of media items related to a plurality of candidate points of interest within a proximal distance of the identified geographical location, wherein the plurality of media items are received based on temporal characteristics associated with the plurality of candidate points of interest;

present the plurality of media items;

receive a selection of at least two of the plurality of media items; and display a travel route through at least two points of interest corresponding to the selection of the at least two of the plurality of media items.

11. The apparatus of claim 10, wherein the plurality of media items are taken from a community pool of information submitted by at least one member of a user community or a commercial content provider.

12. The apparatus of claim 10, wherein the selection of the at least two of the plurality of media items is based on either a user profile comprising past travels of a corresponding user or collaborative filtering.

13. The apparatus of claim 10, wherein the geographical location is identified based on a current location of the apparatus.

14. The apparatus of claim 11, wherein the apparatus is further caused to:

receive feedback from a corresponding user, wherein said feedback comprises an opinion of the user associated with the selected at least two of the plurality of media items; and transmit the feedback to the community pool of information for use by additional users.

15. The apparatus of claim 10, wherein the apparatus is further caused to display at least one additional travel route.

16. The apparatus of claim 10, wherein the apparatus is a mobile device and the travel route is generated by the mobile device.

17. The apparatus of claim 10, wherein the apparatus is a mobile device and the mobile device receives the travel route from a server.

18. The apparatus of claim 10, wherein the apparatus is further caused to receive a selection of at least two of the plurality of media items further comprise receiving an input indicating an acceptance or rejection of each of the at least one of the plurality of media items.

19. The method of claim 1, wherein the plurality of media items are filtered based on a user schedule establishing proximate whereabouts of a user of the travel route.

* * * * *